United States Patent [19]
Sekine et al.

[11] Patent Number: 4,872,540
[45] Date of Patent: Oct. 10, 1989

[54] CLUTCH CONTROL METHOD FOR FLUID TORQUE CONVERTER OF VEHICULAR TRANSMISSION

[75] Inventors: Noboru Sekine; Takashi Aoki; Satoshi Terayama, all of Saitama, Japan

[73] Assignee: Honda Giken Kogyo Kabushiki Kaisha, Tokyo, Japan

[21] Appl. No.: 36,567

[22] Filed: Apr. 9, 1987

[30] Foreign Application Priority Data

Apr. 10, 1986 [JP] Japan .................................. 61-81198

[51] Int. Cl.[4] ...................... F16H 45/02; B60K 41/02
[52] U.S. Cl. .................................. 192/0.076; 192/3.31
[58] Field of Search ................. 192/0.07, 0.075, 0.076, 192/0.096, 3.28, 3.29, 3.3, 3.31, 103 F

[56] References Cited

U.S. PATENT DOCUMENTS

| | | | |
|---|---|---|---|
| 4,422,353 | 12/1983 | Suga et al. ...................... | 192/3.31 X |
| 4,456,107 | 6/1984 | Ito et al. ............................. | 192/3.31 |
| 4,473,882 | 9/1984 | Suzuki et al. ................... | 192/3.31 X |
| 4,484,497 | 11/1984 | Hibino et al. .................... | 123/325 X |
| 4,579,208 | 4/1986 | Nishikawa et al. .............. | 192/0.076 |
| 4,585,101 | 4/1986 | Danno ............................. | 192/3.31 |
| 4,619,350 | 10/1986 | Maezono et al. ................ | 192/3.31 |
| 4,768,635 | 9/1988 | Sakurai et al. ................... | 192/0.076 |

FOREIGN PATENT DOCUMENTS

| | | | |
|---|---|---|---|
| 3235396 | 3/1984 | Fed. Rep. of Germany ........ | 74/645 |
| 57-62941 | 4/1982 | Japan ................................. | 192/3.3 |
| 59-200861 | 11/1984 | Japan ................................. | 192/3.3 |
| 60-60368 | 4/1985 | Japan ................................. | 192/3.28 |
| 60-179566 | 9/1985 | Japan ................................. | 192/3.3 |
| 61-119870 | 6/1986 | Japan ................................. | 192/3.3 |

Primary Examiner—Rodney H. Bonck
Assistant Examiner—Richard M. Lorence
Attorney, Agent, or Firm—Lyon & Lyon

[57] ABSTRACT

A clutch control method for a fluid torque converter of a vehiclar transmission which has a clutch for mechanically connecting the input and output sides of the fluid torque converter within a predetermined vehicular speed range by such a relatively low engaging force as to allow slippage of said clutch. The control method includes a step of determining that the throttle opening of the engine has been decreased at a rate higher than a predetermined value and to a value lower than a predetermined reference throttle opening, even if the vehicular speed is within said predetermined range for allowing clutch slippage, and then increasing the engaging force of said clutch to a value higher than that for said reference opening to provide vehicle braking by the engine.

6 Claims, 4 Drawing Sheets

CLUTCH CONTROL METHOD FOR FLUID TORQUE CONVERTER OF VEHICULAR TRANSMISSION

The present invention relates to a method of controlling a clutch for a fluid torque converter of a vehicular transmission, i.e., a clutch provided for mechanically connecting the input and output sides of the fluid torque converter between the engine and the transmission of a vehicle.

In known method of the prior art for controlling the clutch of the above-specified kind, the clutch is directly applied at a high cruising speed of the vehicle and by a relatively low engaging force in a relatively low speed range so as to allow slippage of the clutch so that the torque fluctuations of an engine may be absorbed through the slippage of the clutch to improve fuel economy and driving comfortability.

However, this control method has the problem that sufficient braking effect cannot be produced by the engine in the low speed range when the accelerator pedal is released to decelerate because of the clutch slippage.

In order to solve this problem, the assignee of the present patent application has proposed a method, in which, when the throttle opening of the engine is decreased to a value lower than a predetermined reference opening even if the vehicular speed is within said predetermined low speed range, the engaging force of the clutch is increased to a value higher than that for said reference opening, as is disclosed in Japanese Patent Application No. P60-262676.

It is desirable to determine whether or not it is the driver's intention to decelerate the vehicle by judging whether or not the engine throttle valve is fully closed. Despite of this desire, however, it is difficult to accurately judge, as a practical matter, whether or not the throttle is fully closed, because a signal to be generated in response to the full closure of the throttle will vary to some degree for each individual throttle mechanism due to the mounting tolerances of means for detecting the throttle opening or the tolerances of its parts. Therefore, a slightly larger value than the full closure is set as a reference opening so that, when the throttle opening is decreased to a value lower than said reference opening, the driver's intention to decelerate the vehicle is determined to thereby increase the engaging force of the clutch.

According to this method of determining deceleration, however, in the case of the vehicle running from a flat road to a gentle downhill where the throttle opening is gradually reduced to effect a constant cruise speed with the throttle opening being held between the fully closed position and the reference position, the engaging force of the clutch is increased. As a result, the torque fluctuations from the engine are transmitted through the clutch to the drive wheels to vibrate the vehicular body.

In order to solve this problem, the present invention has an object to provide a control method in which the engaging force of the clutch is increased only in the case of actual deceleration.

In order to achieve the above-specified object, according to the present invention, there is provided a clutch control method for a fluid torque converter of a vehicular transmission, in which a clutch for mechanically connecting the input and output sides of a fluid torque converter connected to an engine is applied in a predetermined vehicular speed range by such a relatively low engaging force as to allow slippage of said clutch, characterized in that, when the throttle opening of said engine is decreased at a rate higher than a predetermined value to a value lower than a predetermined reference opening even if the vehicular speed is within said predetermined range, the engaging force of said clutch is increased to a value higher than that which is normally applied for said reference opening.

In accordance with the method of this invention, the desire to decelerate the vehicle is determined by the releasing rate of the accelerator pedal when the driver intends to decelerate the vehicle, i.e., the reducing rate of the throttle opening is relatively high so that the throttle opening is reduced during the deceleration at a rate higher than a predetermined value and to a value lower than a reference opening even if the vehicular speed is within a range in which the clutch is applied in a slipping state. As a result, the engaging force of the clutch is increased to establish a sufficient braking effect by the engine. On the other hand, if the vehicle comes to a gentle downhill so that the driver gradually releases the accelerator pedal to reduce the throttle opening to a value lower than the reference opening thereby to maintain the speed of the vehicle, the reducing rate of the throttle opening is lower than the predetermined value to leave the engaging force of the clutch unincreased so that the torque fluctuations from the engine are absorbed through the slippage of the clutch to generate no vibration of the vehicular body thereby to improve the driving comfortability.

The foregoing objects and advantages of the present invention will now be described with respect to a preferred embodiment shown in the drawings, wherein.

Figure 1:
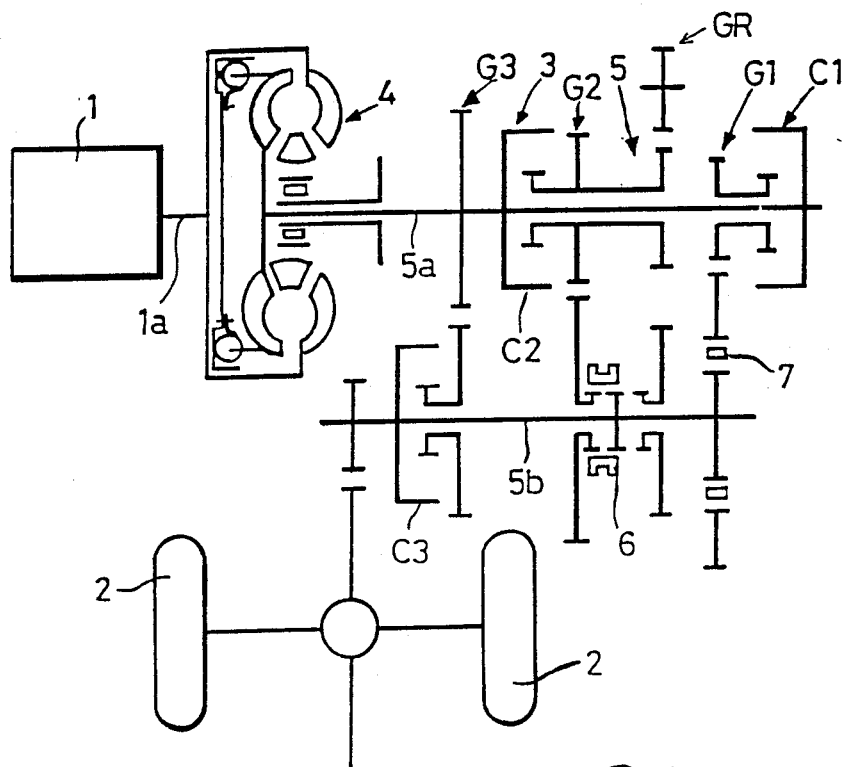
FIG. 1 is a diagrammatic illustration of a vehicle drive system including a torque converter with a clutch of the type to which the present invention is applicable.

Referring now to FIG. 1, the vehicle drive system includes an engine 1 connected through vehicular transmission 3 to the drive wheels 2. This transmission is constructed of a fluid torque converter 4 and an auxiliary transmission 5 for performing speed changes of three forward and one reverse.

The auxiliary transmission 5 is provided with 1st to 3rd speed forward gear trains G1, G2 and G3 and a reverse gear train GR between a drive shaft 5a leading to the fluid torque converter 4 and a driven shaft 5b leading to the drive wheels 2. To the forward gear trains G1, G2 and G3, respectively, there are attached hydraulic clutches C1, C2 and C3 so that the gear trains G1, G2 and G3 may be selectively established by applying the hydraulic clutches C1, C2 and C3, respectively. On the other hand, the reverse gear train GR shares the 2nd speed hydraulic clutch C2 with the 2nd speed gear train G2 so that it is established by the rightward or reverse switching operation of a selector gear 6 for selecting one of the two gear trains G2 and GR. Indicated at reference numeral 7 is a one-way clutch which is disposed in the 1st speed gear train G1 and which is made operative to allow over rotations of the output shaft 5b.

Figure 2:
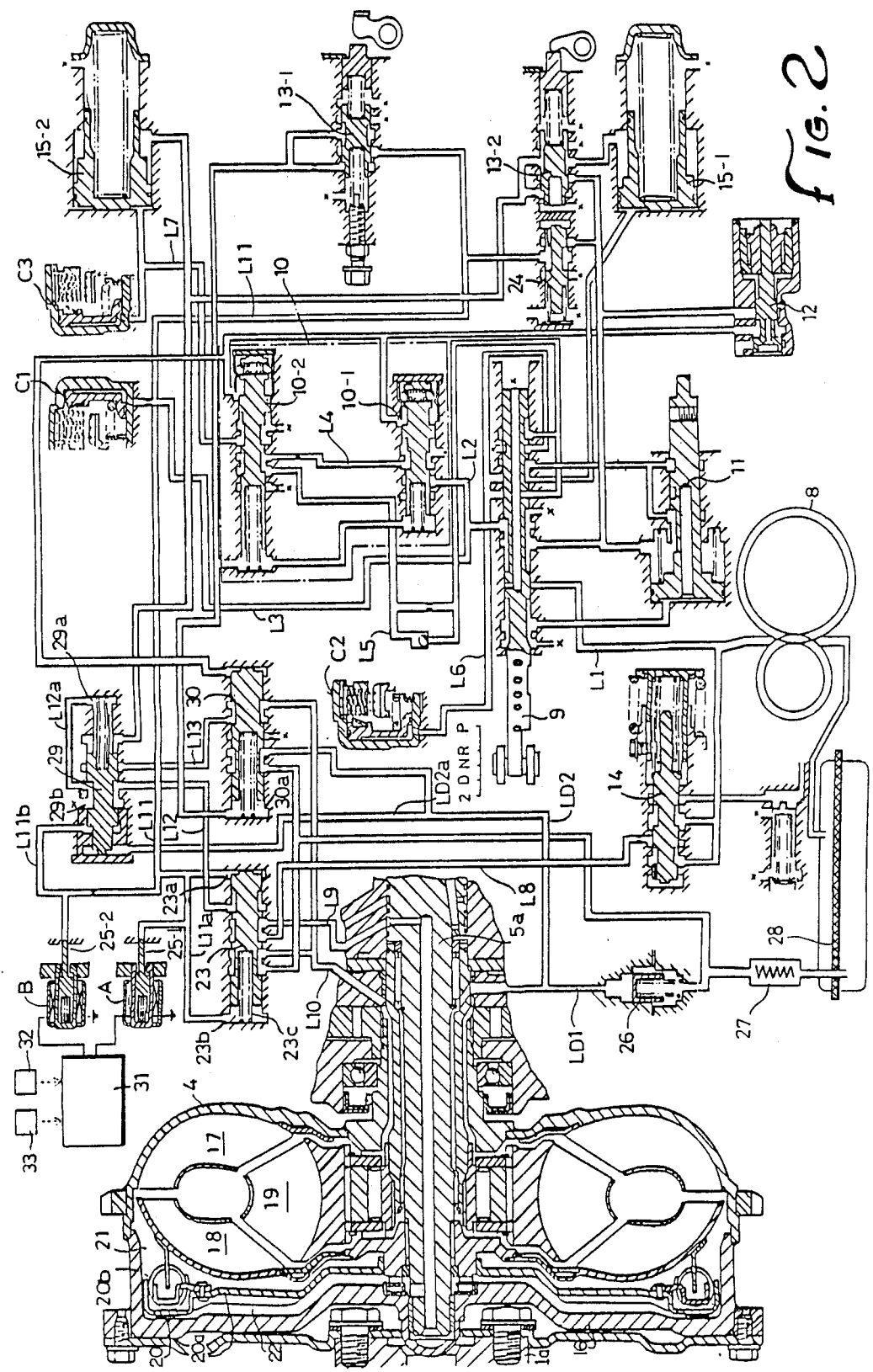
FIG. 2 is a hydraulic circuit diagram of the vehicle transmission and clutch of FIG. 1 with the electronic control circuit for performing the method of this invention.

The aforementioned respective hydraulic clutches C1, C2 and C3 have their oil supplies and drains controlled by a hydraulic circuit shown in FIG. 2, for example. More specifically, the hydraulic circuit is equipped with: an oil pressure source 8; a manual valve 9 which can be switched among five positions, i.e., a parking range "P", a reverse range "R", a neutral range "N", a drive range "D" and a 2nd-speed holding range "2"; a shift valve 10 adapted to be switched in accordance with the vehicular speed and the throttle opening of the engine; and a forward-reverse switching servo-valve 11 for coupling the aforementioned selector gear 6S. In the "D" range position of the manual valve 9, a 1st oil line L1 for oil supply leading from the oil pressure source 8 is connected to a 2nd oil line L2 leading to the shift valve 10 so that the oil is supplied to the 1st speed hydraulic clutch C1 via a 3rd oil line L3 branched from said 2nd oil line L2 and to the respective 2nd and 3rd speed hydraulic clutches C2 and C3 via the shift valve 10. The shift valve 10 is composed of an upstream side 1st-speed/2nd-speed shift valve 10-1 and a downstream side 2nd-speed/3rd-speed shift valve 10-2 which are connected with each other via an intermediate 4th oil line L4. Each of the valves 10-1 and 10-2 has its one end, i.e., its righthand end supplied with a governor pressure from a governor valve 12, which pressure is related to the vehicular speed, and its lefthand end supplied with throttle pressure from a 1st throttle valve 13-1, which is related to the throttle opening of the engine. As the vehicular speed increases over the 1st-2nd speed change characteristic curve indicated at X1 in FIG. 3, the 1st valve 10-1 moves from the righthand 1st speed position to the lefthand 2nd speed position so that the 2nd oil line L2 is connected via the 4th oil line L4 with a 5th oil line L5 at the exit side of the 2nd shift valve 10-2 thereby to supply the oil pressure to the 2nd speed hydraulic clutch C2 by way of a 6th oil line L6 which is connected with said 5th oil line L5 in the "D" range position of the manual valve 9. As the vehicular speed further increases over the 2nd-3rd speed change characteristic curve indicated at X2 in FIG. 3, the 2nd shift valve 10-2 moves from the righthand 2nd speed position to the lefthand 3rd speed position so that the 4th oil line L4 has its connection switched from the 5th oil line L5 to a 7th oil line L7 leading to the 3rd speed hydraulic clutch C3 thereby to supply the oil pressure to the 3rd speed hydraulic clutch C3.

Indicated at reference numeral 14 in the drawing is a regulator valve for regulating the oil pressure supplied from the oil pressure source 8 to a constant line pressure. Numerals 15-1 and 15-2 indicate 2nd and 3rd speed accumulators which lead to the 2nd and 3rd speed oil pressure clutches C2 and C3, respectively. The throttle pressure according to the throttle opening is applied as a back pressure from the 2nd throttle valve 13-2 to each of the accumulators 15-1 and 15-2.

The aforementioned fluid torque converter 4 is equipped in its internal space which is defined on one side by an input case 16 connected to the crankshaft 1a of the engine and on the other side by a pump 17 connected to the input case 16, with both a turbine 18 connected the drive shaft 5a of the auxiliary transmission 5 and a stator 19 interposed between the pump 17 and the turbine 18. The fluid torque converter 4 is further equipped with a hydraulically actuated clutch 20 for mechanically connecting the input side and output side of said torque converter 4, i.e., connecting the input case 16 and the turbine 18. Thus, when the clutch 20 is released, there is afforded a fluid torque transmission by the circulation of the internal fluid among the aforementioned pump 17, turbine 18 and stator 19. When said clutch 20 is applied, on the other hand, a mechanical torque transmission is afforded therethrough.

The clutch 20 may be of various types, e.g., of multi-disc friction type. In the shown example, the clutch 20 is a single-disc friction clutch which has its clutch disc 20a made movable in the axial direction in the gap between the input case 16 and the turbine 18 and connected to the turbine 18 through a damper spring 20b. The internal space of the fluid torque converter 4 is partitioned by said clutch disc 20a into a 1st vane accommodating chamber 21 located at one side and a back pressure chamber 22 located between the other side and the input case 16. The clutch can be switched by a later-described control valve 23 to a disconnected state, in which the oil is supplied from the back pressure chamber 22 to said internal space, and to a connected state in which the oil is supplied from said chamber 21. In the clutch-connected state, said clutch disc 20a is brought into frictional engagement with said input case 16 by the engaging force according to the pressure difference between the internal pressure (which will be referred to as Pa) of said accommodating chamber 21 and the internal pressure (which will be referred to as Pb) of said back pressure chamber 22.

Said control valve 23 can be switched between a righthand side clutch released position (i.e., the shown position), in which an 8th oil line L8 leading to the regulator valve 14 is connected with a 9th oil line L9 leading to the back pressure chamber 22 to supply the oil to said back pressure chamber 22, and a lefthand side clutch applied position in which the 8th oil line L8 is connected with a 10th oil line L10 leading to the vane accommodating chamber 21 thereby to supply the oil to said chamber 21. Said control valve 23 has its righthand oil chamber 23a supplied through a 11th oil line L11 with an output pressure (which will be referred to as Pm) from a modulator valve 24 on the upstream side of the aforementioned 1st throttle valve 13-1 and its lefthand oil chamber 23b connected with an oil line L11a having an orifice leading to said 11th oil line L11 and said oil line L11a connected with a 1st atmospheric release valve 25-1 of the electromagnetic type. When said release valve 25-1 is opened, said control valve 23 is switched to the clutch applied position against the action of a spring 23c by the pressure difference between said two oil chambers 23a and 23b to apply the clutch 20.

A 1st regulating valve 26, comprising a check valve, is disposed in the 1st drain line LD1 leading to the vane accommodating chamber 21 so as to regulate the pressure Pa to a predetermined relatively high level. Numerals 27 and 28 indicate an oil cooler and an oil reservoir, respectively.

Here, the operating state of the clutch 20 is switched in accordance with the changes in the engaging force due to the increase or decrease of the difference between the pressure Pa and Pb, between a directly applied state in which its input and output sides are directly connected and a slipping state in which the input and output sides are allowed to slip. The system is constructed so as to variably control that pressure difference, i.e., to variably control the engaging force in accordance with the running state of the vehicle and engine.

Specifically, there are provided a 12th oil line L12, which is connected with the 9th oil line L9 leading to the back pressure 22 in the clutch applied position of the control valve 23, and a 13th oil line L13 which is branched from the 10th oil line L10 leading to the vane accommodating chamber 21. The two oil lines L12 and L13 are connected through a 2nd regulating valve 29 to provide a communication passage for communicating the two chambers 21 and 22. Moreover, a 2nd drain line LD2 is provided in parallel with the 1st regulator valve 26 disposed in the aforementioned 1st drain line LD1. There is also provided a control valve 30 for opening said 2nd drain line LD2 and said 13th oil line L13 in the slipping state of the clutch 20 and closing said two oil lines LD2 and L13 in the directly connected state. More specifically, said control valve 30 is urged in the leftward closing direction by the governor pressure coming from the governor valve 12 and in the rightward opening direction by the action of a spring 30a and the throttle pressure coming from the 1st throttle valve 13-1 so that it is switched between an opening (shown) position, in which it opens said two oil lines LD2 and L13 in a lower speed range than a curve Z of FIG. 3, and a closing position in which it closes the same in a higher speed range.

The aforementioned 2nd regulator valve 29 is of a pressure difference responding type, in which it is urged in the rightward opening direction by the oil pressure acting via a pilot oil line LD2a branched from the 2nd drain line LD2, i.e., the pressure Pa, and in the leftward closing direction by the oil pressure acting via a pilot oil line L12a leading to said 12th oil line L12, i.e., the pressure Pb. The 2nd regulator valve 29 is further urged in the closing direction by the action of a spring 29a and a throttle pressure (which will be referred to as P$\theta$) coming from a 2nd throttle valve 13-2 and in the opening direction by the pressure Pm inputted from the aforementioned 11th oil line L11 via an oil line L11b with an orifice. This oil line L11b is connected with an electromagnetic type 2nd atmospheric release valve 25-2.

Figure 4:
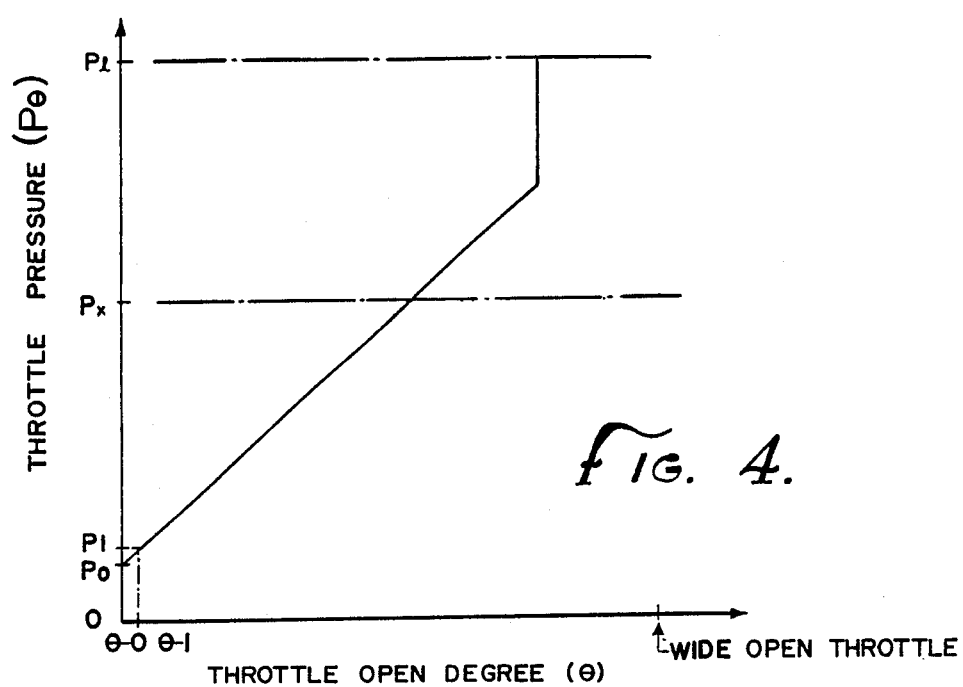
FIG. 4 is a graph showing the output characteristics of the second throttle valve incorporated into the hydraulic circuit of FIG. 2.

It is to be noted that the throttle pressure P$\theta$ will change, as shown in FIG. 4, in accordance with the throttle opening of the engine, whereas the pressure Pm is set at a lower pressure than a line pressure Pl.

The aforementioned 1st and 2nd atmospheric release valves 25-1 and 25-2 are controlled to be opened and closed by an electronic control circuit 31 which is equipped with a microcomputer. Said circuit 31 is fed with both a signal coming from throttle opening detecting means 32 and a signal coming from vehicular speed detecting means 33 to open the 1st atmospheric release valve 25-1 in a clutch applied region, which is hatched in FIG. 3 at a higher speed side than a curve Y, thereby to apply the clutch 20, as has been described hereinbefore, and to open the 2nd atmospheric release valve 25-2 only in case special conditions are satisfied while normally leaving the same closed, as will be described in more detail hereinafter.

Figure 3:
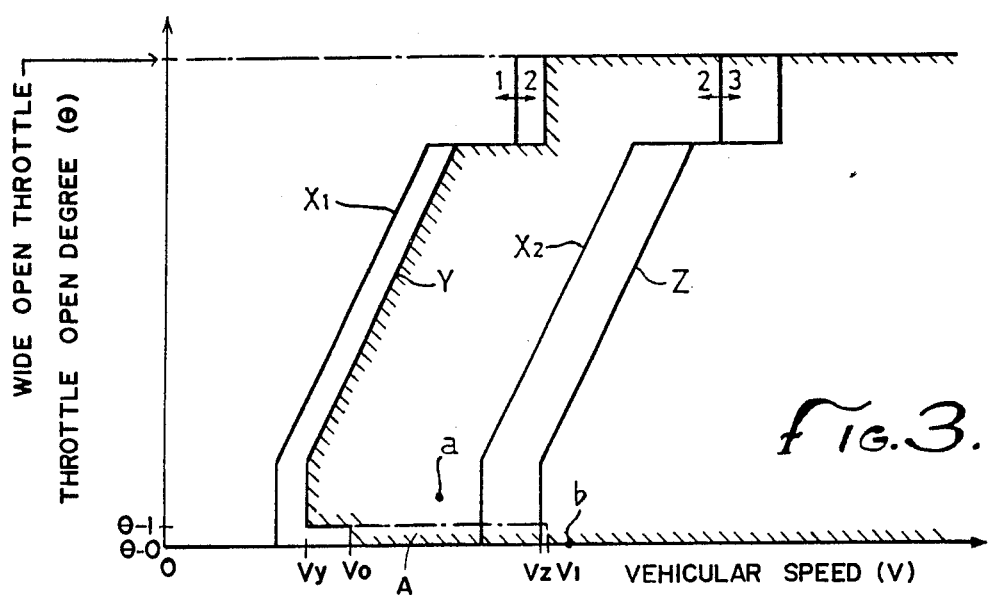
FIG. 3 is a graph illustrating the operating characteristics of the clutch in the method of this invention.

Here, in a higher range than a curve Z in FIG. 3, the control valve 30 is switched to its closing position, as has been described above, to close the 13th oil line L13 and the 2nd drain line LD2 to supply the oil not from the 13th oil line L13 to the 12th oil line L12 but from the 12th oil line L12 to a drain port 29b of the 2nd regulator valve 29 so that the pressure Pb approaches the atmospheric value. However, the drainage via the 2nd drain line LD2 is interrupted so that the pressure Pa is held at a relatively high level determined by the 1st regulator valve 26. As a result, the difference between the pressures Pa and Pb is raised to increase the engaging force of the clutch so that the clutch 20 is applied in the directly connected state.

In the vehicular speed range between the curves Y and Z, on the other hand, the control valve 30 is switched to its opening position, in which the 2nd drain line LD2 and the 13th oil line L13 are opened to drain the oil in the inside of the vane accommodating chamber 21 from the 2nd drain line LD2 not via the 1st regulator valve 26 so that the pressure Pa takes a relatively low level determined by the passage resistance of said 2nd drain line LD2. On the other hand, the back pressure chamber 22 is fed with the oil pressure, which is regulated by the 2nd pressure regulating valve 29, via the communication line composed of the 13th oil line L13 and the 12th oil line L12 to drop the difference between the pressures Pa and Pb to a lower level than that in the directly connected state so that the clutch 20 is applied in the slipping state.

Here, if the 2nd regulator valve 29 has an area S1 for receiving the pressures Pa and Pb and an area S2 for receiving the pressures P$\theta$ and Pm, and if the spring 29a has a force F, the relationship among the forces acting upon the 2nd regulator valve 29 is expressed by the following equation:

$$PaS1+PmS2=Pb\,S1+P\theta S2+F.$$

Hence, the following equation holds:

$$Pa-Pb=S2/S1\,P\theta+F/S1-S2/S1\,Pm \tag{1}$$

Figure 5:
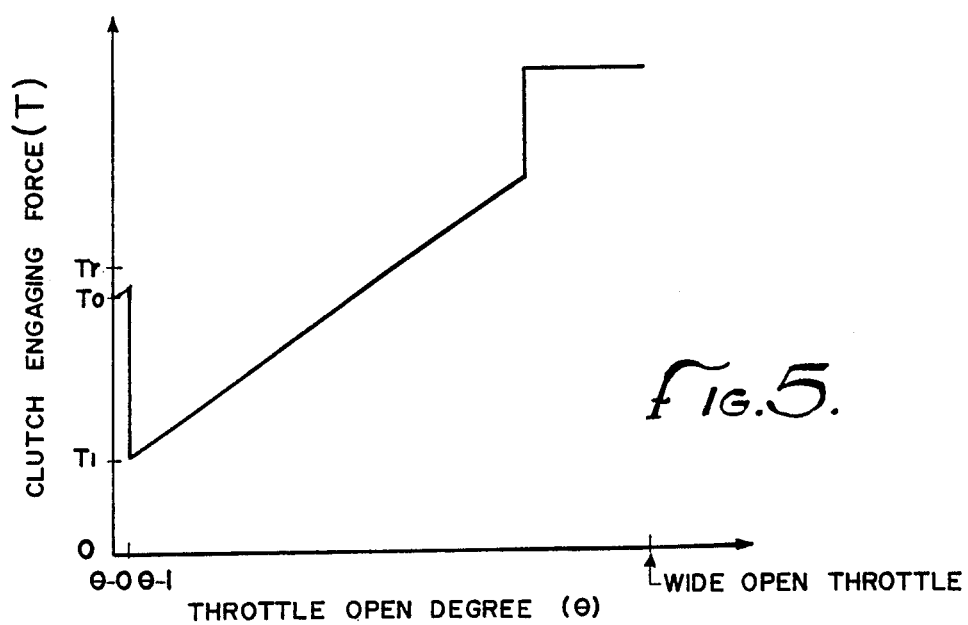
FIG. 5 is a graph showing the changing clutch-engaging force characteristics.

As a result, in the vehicular speed range in which the clutch 20 is applied in its slipping state, the clutch engaging force increases, as shown in FIG. 5, in accordance with the equation (1) as the throttle opening of the engine increases.

This means that the clutch engaging force increases in accordance with the increase in the output torque of the engine due to the increase in the throttle opening. Above a given amount of throttle opening, the speed ratio of the fluid torque converter is held at a constant value of about 0.92 to 0.93 irrespective f the change in the output torque. The torque fluctuations that are liable to increase in a low vehicular speed range are absorbed through the slippage of the clutch 20 to prevent the vehicular body from vibrating.

When, even in a vehicular speed range between the curves Y and Z in which the clutch 20 is applied in its slipping state, the throttle opening is reduced at a rate higher than a predetermined value to a predetermined reference opening (which will be indicated at $\theta$-1) slightly larger than a fully-closed throttle opening (which will be indicated at $\theta$-0), that is to say, when the abrupt reduction in the throttle opening brings the running state into a region A enclosed by dotted lines in FIG. 3, the 2nd atmospheric release valve 25-2 is opened to interrupt the application of the pressure Pm to the 2nd regulator valve 29.

According to this construction, the term of the pressure Pm of the aforementioned equation (1) drops to zero so that the engaging force of the clutch 20 is accordingly increased.

Here, if the pressure $P\theta$ is assumed to be at Po for the throttle opening $\theta$-0 and at P1 for the throttle opening $\theta$-1, the difference between the clutch engaging force To for $\theta$-0 and the clutch engaging force T1 for $\theta$-1 is expressed by the following equation for a pressure receiving area So of the clutch disc 20a:

$$To - T1 = So \{(S2/S1 \cdot Po + F/S1) - (S2/S1 \cdot P1 + F/S1 - S2/S1 \cdot Pm)\} = So \, S2/S1 \, \{Pm + (Po - P1)\}.$$

In this case, as is apparent from FIG. 4, Po>P1, and Pm≈Po, P1, so that the force To is far higher than the force T1. As a result, the clutch 20 is reluctant to slip so that a sufficient braking effect by the engine can be obtained during the deceleration with the accelerator pedal being released.

The engaging force To can be set at a level Tr that can transmit 100% of the counter drive torque from the drive wheels 2 thereby to bring the clutch 20 into a completely directly connected state. However, if the level To is set at a value slightly smaller than the level T whereby the speed ratio of the fluid torque converter 4 may assume a value of 1.02 to 1.03, for example, it is advantageously possible to maintain the braking effect by the engine at satisfactory level and to prevent the vehicular body from vibrating when the engine conducts the braking effect.

While the counter drive torque is being transmitted, the revolutions of the driving wheels 2 do not periodically fluctuate very much, in contrast to when they are being driven from the engine 1, by reason of the fluctuations of the load among the strokes of the engine 1 which causes objectionable vibration of the vehicular body. However, if it is so desired, even those minor vibrations that may occur during such counter drive torque application may be absorbed by controlled slippage of the clutch 20, as described above.

The region A is set within a range of $\theta<\theta$-1 and Vo<V<V1, as shown in FIG. 3, for a throttle opening $\theta$ and a vehicular speed V, and the speed V1 is made slightly higher than a lower limit Vz of directly applied region of the clutch 20 defined by the curve Z. For V1=Vz, the control valve 30 would be opened on a higher speed side than the speed V1 because of the tolerances of the hydraulic control parts, namely, the relation of V1<Vz would hold so that the clutch engaging force during the deceleration could not be increased in the vehicular speed range between V1 and Vz. To prevent this phenomena is the reason why the aforementioned setting were made.

Moreover, the curve Y is offset to a higher speed side for a range of $\theta<\theta$-1 to make the vehicular speed Vo higher than a speed Vy for $\theta=\theta$-1. This is because it is intended to prevent the engine stop which might otherwise be caused by the action of the clutch 20 during an abrupt deceleration to a speed lower than Vo.

Figure 6:
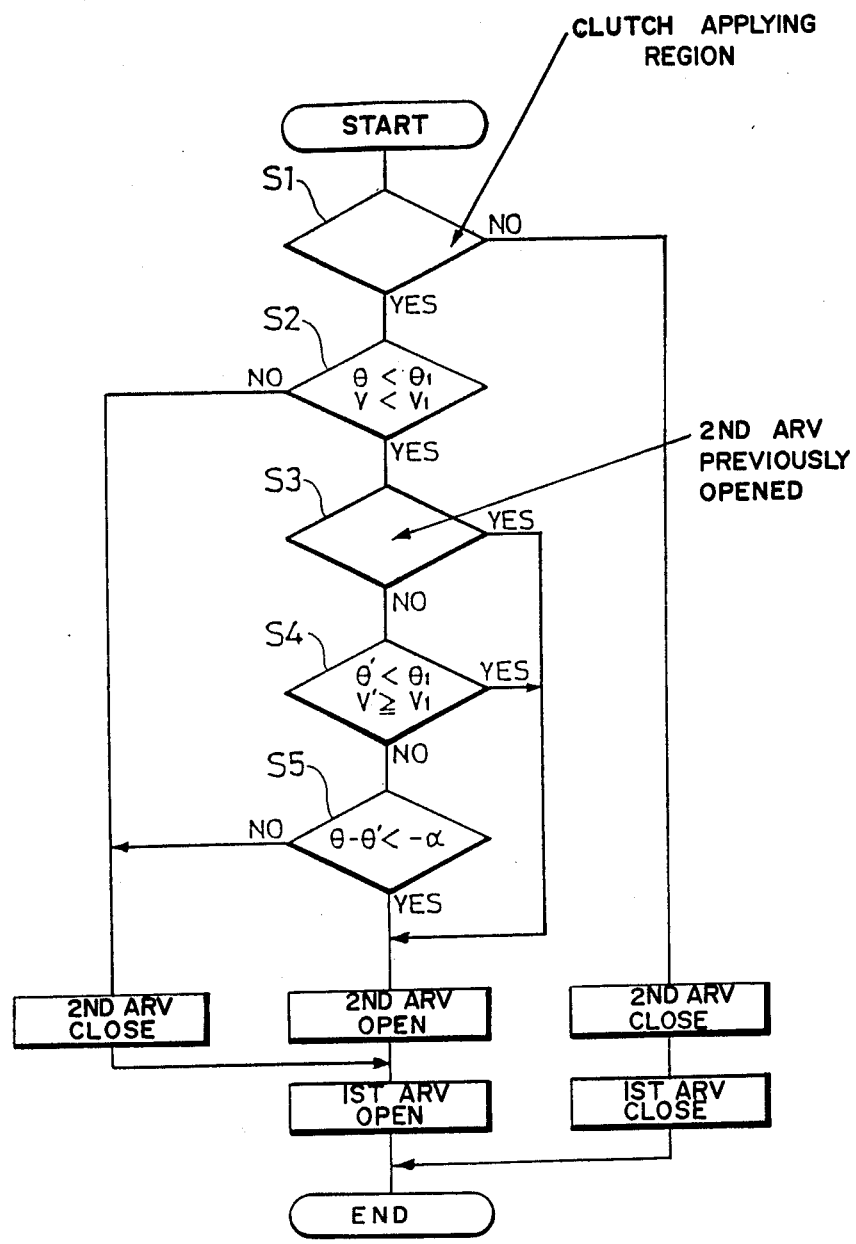
FIG. 6 is a flow chart showing the program of the electronic control circuit for the method of this invention.

FIG. 6 is a flow chart showing the program of the aforementioned electronic control circuit 31. The electronic control circuit 31 uses evenly-spaced clock pulses to synchronize its internal operation and the operation of the valves controlling the clutch. Each of the decision-making steps in the flow chart is in synchronization with these clock pulses, and the input sensors sample throttle opening $\theta$ and vehicular speed V at regular intervals in synchronization with the clock pulses. At a step S1, it is judged whether or not the running state is in the clutch applied region, i.e., in a higher region than the curve Y. At a step S2, it is judged whether or not the newest throttle opening $\theta$ and vehicular speed V are within the ranges of $\theta<\theta$-1 and V<V1, i.e., within the region A. At a step S3, it is judged whether or not the 2nd atmospheric release valve (note, "atmospheric release valve" is abbreviated in FIG. 6 as "ARV") 25-2 has been opened in the preceding cycle. At a step S4, it is judged whether or not the preceding throttle opening $\theta'$ and vehicular speed V' are within the ranges of $\theta'<\theta$-1 and V'≧V1. At a step S5, a new throttle opening $\theta$ is determined and is compared with the preceding throttle opening $\theta'$, and a new value $\Delta\theta=\theta-\theta'$ is computed. The elapsed time $\Delta t=t-t'$ is also determined for these respective throttle openings. It is then judged whether or not $\Delta\theta/\Delta t$ is smaller than a predetermined negative reference value, $-\alpha$, i.e., whether or not the reducing rate of the throttle opening is higher than a predetermined value.

If the running state falls outside of the clutch applied region, a judgment of "NO" is made at the step S1 so that both the 1st and 2nd atmospheric release valves 25-1 and 25-2 are closed. Within the clutch applied region, on the contrary, a judgment of "YES" is made at the step S1, and the program advances to the step S2. Outside of the region A, a judgment of "NO" is made at the step S2. In this case, the 2nd atmospheric release valve 25-2 is held in its closing state, but the 1st atmospheric release valve 25 is opened so that the control valve 23 is switched to the clutch connected position, as has been described hereinbefore. By the control of the control valve 30, the clutch 20 is applied in its slipping state within a predetermined vehicular speed range between the curves Y and Z and in its directly connected state in a vehicular speed range higher than the curve Z.

If, moreover, the accelerator pedal is released abruptly so as to decelerate the vehicle from the running state existing in the slipping region of the clutch 20, as indicated at "a" in FIG. 3, to reduce the throttle opening $\theta$ to $\theta$-0, the running state shifts to the region A so that the program advances from the step S2 in the order of the steps S3→S4 to the step S5, at which a judgment of "YES" is made to open the 2nd atmospheric release valve 25-2. Subsequently, a judgment of "YES" is judged at the step S-3 so long as the running state is within the region A. As a result, said valve 25-2 is held in its opening state so that the clutch engaging force is increased, as described above, to ensure a sufficient braking effect by the engine.

In case, however, the vehicle running at the point "a" comes to a gentle downhill and the velocity of the vehicle is to be maintained by gradually releasing the accelerator pedal to shift the running state to the region A and by holding the throttle opening $\theta$ between the values $\theta$-0 and $\theta$-1, a judgment of "NO" is made at the step S5 to leave the 2nd atmospheric release valve 25-2 closed so that the vibrations of the vehicular body that would otherwise result from the increase in the clutch engaging force are not caused. Incidentally, if the accelerator pedal is abruptly released during such constant velocity operation so as to decelerate the vehicle, a judgment of "YES" is made at the step S5 so that the 2nd atmospheric release valve 25-2 is opened to increase the clutch engaging force.

In case, on the other hand, the accelerator pedal is released from a vehicular speed higher than V1 to decelerate the vehicle so that the running state is shifted from the vehicular speed indicated at point "b" in FIG. 3, in which the clutch 20 is applied in its directly connected state, to the region A, a judgment of "YES" is made at the step S4 so that the 2nd atmospheric release valve 25-2 is opened to ensure a sufficient braking effect by the engine even subsequent to the vehicular speed lower than V1.

In the embodiment thus far described, the 2nd atmospheric release valve 25-2 is opened evenly during the deceleration in the region A. Despite of this fact, however, the speed ratio of the fluid torque converter 4 may be actually measured so that said valve 25-2 may be subjected to a feedback control in a manner to set a measured speed ratio at a predetermined value (e.g., 1.02 to 1.03).

On the other hand, the aforementioned throttle opening detecting means 32 is exemplified by a potentiometer which is made responsive to either the opening or closing operations of the throttle valve of the engine or the motions of the accelerator pedal, and the vehicular speed detecting means 33 is exemplified by a lead switch or the like, which is associated with a magnet rotor rotating with the driven shaft 5b for generating a pulse signal according to the r.p.m. of said shaft 5b.

As has been described hereinbefore, according to the present invention, the clutch engaging force is increased during a deceleration so that a sufficient braking effect by the engine is obtained, but is not increased even if the throttle opening is below the reference opening, when the accelerator pedal is gradually released to maintain the speed of the vehicle on a gentle downhill or the like and, therefore, the vibrations of the vehicular body resulting from the increase in the engaging force during the downhill cruising are prevented to improve the driving comfortability.

Although the invention has been described with respect to a preferred embodiment, it will appear to those skilled in the art that the invention is applicable to other embodiments within the scope of the appended claims.

The claimed invention is:

1. A method for controlling a clutch in a fluid torque converter for a vehicular transmission of a vehicle, said torque converter connected on an input side to an engine having a throttle valve for controlling a throttle opening, and connected on an output side to an auxiliary transmission, said converter being provided with a clutch to which a high force is applied for positively connecting the input and output sides of said converter when the vehicle is operated above a predetermined speed range and to which a relatively low force is applied to allow slippage when the vehicle is operated within said predetermined speed range with the slippage varying inversely relative to the vehicle speed, the method comprising the steps of, determining the throttle opening and the rate of change of the throttle opening, and increasing the force applied to the clutch to a valve higher than the relatively low force applied for a given throttle opening for reducing slippage at that given throttle opening when the throttle opening is lower than a predetermined reference throttle opening and the throttle opening is decreasing at a rate higher than a predetermined rate value.

2. The clutch control method of claim 1 wherein said predetermined reference throttle opening is greater than a fully closed throttle opening.

3. The clutch control method of claim 2 wherein said predetermined reference throttle opening is only slightly open from the fully closed throttle opening position for avoiding errors in detecting said fully closed throttle opening position.

4. The clutch control method of claim 1 wherein said predetermined reference throttle opening is a slightly larger than a fully closed throttle position.

5. The clutch control method of claim 1 wherein said predetermined rate value is higher than a preselected rate of throttle opening decrease corresponding to a rate of decrease typically encountered during a transition in vehicle travel from level to downhill without intentional deceleration, whereby the clutch engaging force is not increased during said transition.

6. A method for controlling a clutch in a fluid torque converter of a vehicular transmission connecting vehicle wheels to an engine having a throttle wherein said clutch is operated in relatively low engaging force in an intermediate vehicular speed range, comprising the steps during throttle closing movement of determining whether an engaging force is being applied to the clutch, determining the rate of closing of the throttle and comparing that actual rate to a predetermined rate of throttle closing, determining the actual throttle opening at the conclusion of the closing movement and comparing that with a predetermined reference throttle opening, and increasing the clutch engaging force upon each of the following characteristics having been determined by the foregoing steps; (1) clutch engaging force is being applied, (2) the actual rate of closing of the throttle exceeds said predetermined rate, and (3) the actual throttle opening at the conclusion of closing movement is less than said predetermined reference throttle opening.

* * * * *